E. H. KOENIG.
STENCIL APPARATUS.
APPLICATION FILED FEB. 10, 1908.
903,989.
Patented Nov. 17, 1908.
2 SHEETS—SHEET 1.
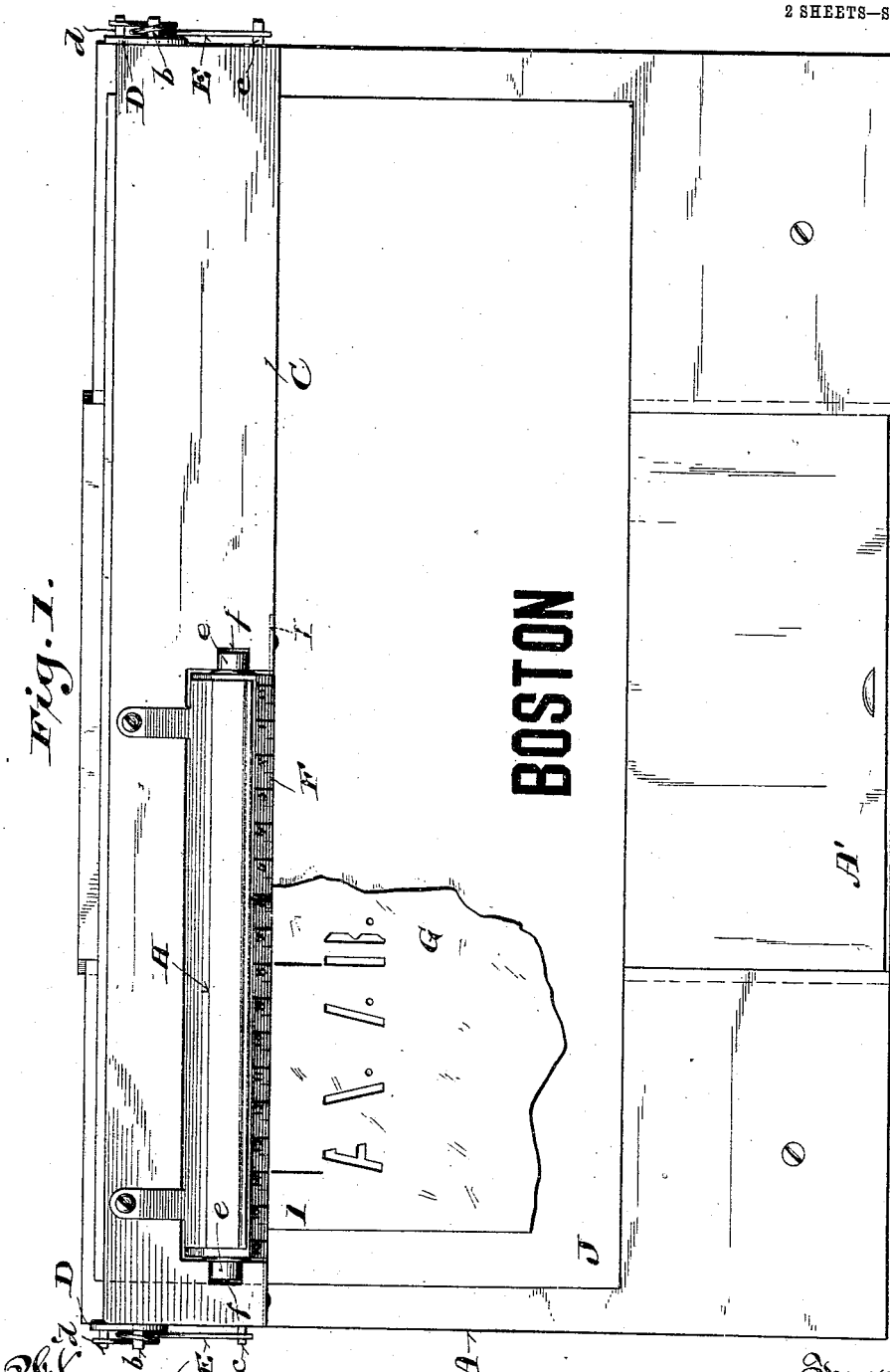

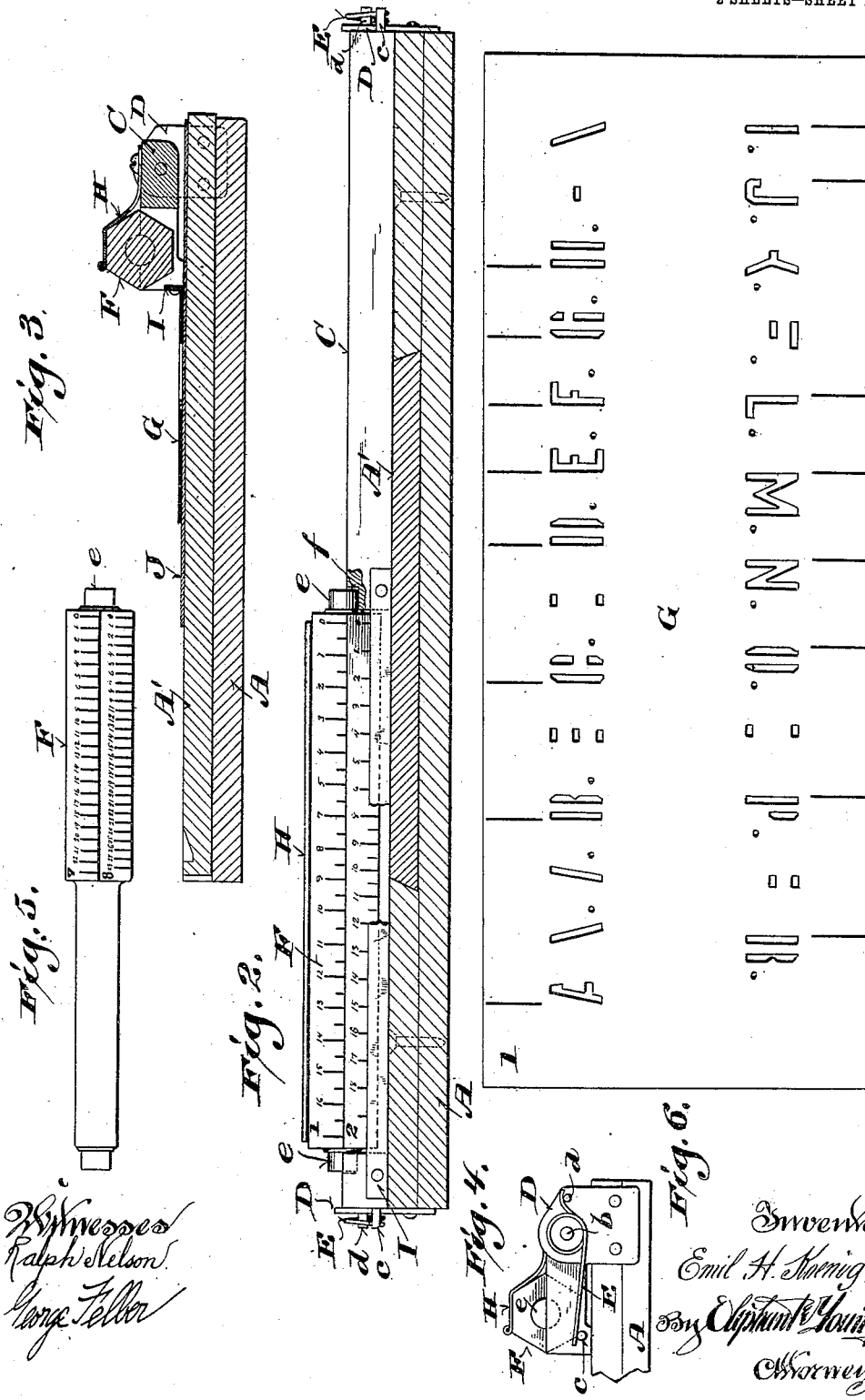

UNITED STATES PATENT OFFICE.

EMIL H. KOENIG, OF MILWAUKEE, WISCONSIN, ASSIGNOR OF ONE-HALF TO FRANCIS DUHNE, JR., OF MILWAUKEE, WISCONSIN.

STENCIL APPARATUS.

No. 903,989.  Specification of Letters Patent.  Patented Nov. 17, 1908.

Application filed February 10, 1908. Serial No. 415,098.

*To all whom it may concern:*

Be it known that I, EMIL H. KOENIG, a citizen of the United States, and resident of Milwaukee, in the county of Milwaukee and State of Wisconsin, have invented certain new and useful Improvements in Stencil Apparatus; and I do hereby declare that the following is a full, clear, and exact description thereof.

My invention consists in certain peculiarities of construction and combination of parts in a scale and stencil apparatus designed to facilitate the preparation of signs, store-announcements, price-cards and the like; said invention being hereinafter more particularly described with reference to the accompanying drawings and subsequently claimed.

Figure 1 of the drawings represents a plan view of my improved apparatus of the kind stated, a stencil-card being broken away over a sign-sheet or card clamped on the base of said apparatus; Fig. 2, a front elevation in longitudinal section through said base, parts being broken away; Fig. 3, a transverse section of the apparatus; Fig. 4, an end view of a fragment of same; Fig. 5, a front elevation of a rotary adjustable roller having angular faces thereof arbitrarily scaled, and Fig. 6, a plan view of one of a series of stencil-cards.

Referring by letter to the drawings, A indicates a preferably portable base, of any suitable dimensions, having a perpendicular slide section A' flush at the top with the remainder thereof. A preferred economical construction of the base is herein shown as consisting of a bottom piece surmounted by upper battens with which the slide section of said base is in bevel-match. However the base may be variously constructed, and in some instances the slide may be omitted.

Trunnions $b$ of a clamp-bar C have their bearings in brackets D secured to ends of the base A adjacent to its upper edge, and springs E are arranged under tension with respect to lugs $c$, $d$, of said bar and brackets respectively. The front of the clamp-bar is recessed adjacent to one end to obtain clearance for a roller F, having polygonal contour and journals $e$ for which bearing-sockets are provided in said bar. Each face of the roller is arbitrarily scaled to correspond with the proper spacing of letters and other characters to be obtained by stenciling.

A series of stencil cards are provided, as parts of the apparatus, for different sizes and styles of characters. Each card and the corresponding scale for same on the roller F are arbitrarily indexed. For example the stencil-card G herein shown and the scale for same on the aforesaid roller are indexed with the numeral 1, other cards and scales for same being indexed 2, 3, and so on. A space-indicator line for each character or starting part of same is displayed on the stencil-cards, the stencils being cut for some characters as a whole and for parts common to various characters, as shown in Fig. 6.

As a matter of convenience and arbitrary choice, two interchangeable partly hexagonal rollers are herein shown to provide for twelve scales for as many different sizes or styles of characters to be stenciled, but the number of scales and sizes or styles of characters may be indefinitely varied, there being as many stencil-cards as may be necessary to provide for all the letters or other characters of one size or style, also stencil-cards for ornamental designs properly indexed with respect to the corresponding scale. The roller F in Figs. 1 and 2 has its angular faces scaled for wider spacing than the angular faces of the roller F' in Fig. 5. Hence the polygonal portion of the roller F' need not be as long as that of the roller F and is so shown.

Arranged in connection with the clamp-bar C is a spring detent H engageable with the roller F to hold the same in position to disclose a desired scale, the dimensions of this detent and of a stencil-card stop-strip I secured to said bar being preferably such as to obscure all but said scale in front of the operator.

A sheet or card J to be stenciled is held in adjusted position on the base A by the clamp-bar C and moved upward from time to time for line-spacing. If the sheet or card be less wide than the section A' of said base, it may be secured on the same and this section adjusted under said clamp-bar for line-spacing on said sheet or card. In any event the clamp-bar is tilted against resistance of the springs E to permit the line-spacing adjustment of the sheet or card to be stenciled.

To center a letter or other character on the sheet or card to be stenciled, the proper stencil-card is positioned over this sheet or card against the stop-strip I, shown in Figs. 2 and 3, to have the indicator mark for the start of the character register with O on the corresponding scale previously brought into proper position, if a word, the number of letters therein, counting as spaces on the scale, is estimated, and the indicator on the stencil-card for the starting letter is alined with the scale-space mark, reading to the left of O, a number of degrees equal to one-half the number of letters in said word. For phrases and sentences, the total number of letters in the words of same and the spaces between words are estimated, and the start made similar to that for a single word. The letter "I," wherever it occurs, and the spaces between words, each count one-half a space on the scale, this rule being observed in the stenciling operations.

To form a character from stencil parts of same, the stencil card is shifted to various positions in order to complete said character after properly starting the same as above specified. Characters and parts of same for the same style of lettering may be all cut in one stencil-card or in a plurality of such cards as may be necessary, the several cards being of uniform dimensions. Succeeding each character or concluding part of same is a dot-aperture in the stencil cards, and the stenciled dot marks a center for the beginning of another character, whereby proper spacing is had between characters.

While I have described peculiar stencil-cards and the use of each in conjunction with a corresponding scale, I do not broadly claim the same as my invention, my improvements being to details of the apparatus as a whole for the purpose described.

I claim:

1. The combination of a base, a rotary adjustable partly polygonal roller arbitrarily arranged with reference to the base to be clear of a sheet or card to be stenciled thereon, faces of the roller being arbitrarily scaled, and stencil-cards each having characters and parts of same therein registrable with degrees of a corresponding scale of said roller.

2. The combination of a base, a rotary adjustable partly polygonal roller arbitrarily arranged with reference to the base to be clear of a sheet or card to be stenciled thereon, faces of the roller being arbitrarily scaled, and stencil-cards each having indicators for characters and parts of same therein registrable with degrees of a corresponding scale of a roller.

3. The combination of a base for the support of a sheet or card to be stenciled, a spring-controlled clamp-bar in rocking connection with the base, an arbitrarily arranged partly polygonal roller in rotary adjustable connection with the clamp-bar, the faces of the roller being arbitrarily scaled, and stencil-cards each having characters and parts of same therein registrable with degrees of a corresponding scale of said roller.

4. The combination of a base for the support of a sheet or card to be stenciled, a spring-controlled clamp-bar in rocking connection with the base, an arbitrarily arranged partly polygonal roller in rotary adjustable connection with the clamp-bar, the faces of the roller being arbitrarily scaled, a detent for holding the roller in position to disclose a selected scale of same, and stencil-cards each having characters and parts of same therein registrable with degrees of a corresponding scale of said roller.

5. The combination of a base for the support of a sheet or card to be stenciled thereon, a rotary adjustable partly polygonal roller arbitrarily arranged with reference to the base clear of said sheet or card, the faces of the roller being arbitrarily scaled, a stop-strip on said base in proximity to said roller, and strip-abutting stencil-cards each having characters and parts of same therein registrable with degrees of a corresponding scale of the aforesaid roller.

6. The combination of a base having a sliding section, a rotary adjustable partly polygonal roller arbitrarily arranged with reference to the base to be clear of a sheet or card to be stenciled on the same or its sliding section, the faces of the roller being arbitrarily scaled, and stencil-cards each having characters or parts of same therein registrable with degrees of a corresponding scale of said roller.

7. The combination of a base having a sliding section, a spring-controlled clamp-bar in rocking connection with the base, a partly polygonal roller arbitrarily arranged in rotary adjustable connection with said bar, the faces of the roller being arbitrarily scaled, means for holding the roller in adjusted position to disclose a selected scale, a stop-strip in proximity to said roller, and strip-abutting stencil-cards each having characters and parts of same therein registrable with degrees of a corresponding scale of the aforesaid roller over a sheet or card to be stenciled.

In testimony that I claim the foregoing I have hereunto set my hand at Milwaukee in the county of Milwaukee and State of Wisconsin in the presence of two witnesses.

EMIL H. KOENIG.

Witnesses:
N. E. OLIPHANT,
GEORGE FELBER.